(12) United States Patent
Kfir et al.

(10) Patent No.: US 10,763,685 B1
(45) Date of Patent: Sep. 1, 2020

(54) SYSTEM AND METHODS FOR REGULATING CHARGING RATE BASED ON ENVIRONMENTAL CONDITIONS

(71) Applicant: Hadal, Inc., Oakland, CA (US)

(72) Inventors: Ben Kfir, San Francisco, CA (US); Doug Traeger, Oakland, CA (US); Robert S. Damus, Alameda, CA (US); Richard J. Rikoski, Alameda, CA (US)

(73) Assignee: HADAL, INC., Oakland, CA (US)

( * ) Notice: Subject to any disclaimer, the term of this patent is extended or adjusted under 35 U.S.C. 154(b) by 82 days.

(21) Appl. No.: 16/008,846

(22) Filed: Jun. 14, 2018

Related U.S. Application Data

(60) Provisional application No. 62/519,273, filed on Jun. 14, 2017.

(51) Int. Cl.
| | | |
|---|---|---|
| *H02J 7/00* | (2006.01) | |
| *B63G 8/00* | (2006.01) | |
| *B60L 53/14* | (2019.01) | |
| *B60L 53/60* | (2019.01) | |

(52) U.S. Cl.
CPC ............ *H02J 7/0091* (2013.01); *B60L 53/14* (2019.02); *B60L 53/60* (2019.02); *B63G 8/001* (2013.01); *H02J 7/0021* (2013.01); *B60L 2200/32* (2013.01); *B60L 2240/36* (2013.01); *B63G 2008/004* (2013.01)

(58) Field of Classification Search
CPC ....... H02J 7/0021; H02J 7/0091; B60L 53/14; B60L 53/60; B60L 2200/32; B60L 2240/36; B63G 8/001; B63G 2008/004

USPC .................................................. 307/9.1, 10.1
See application file for complete search history.

(56) References Cited

U.S. PATENT DOCUMENTS

| | | | |
|---|---|---|---|
| 5,623,195 | A | 4/1997 | Bullock et al. |
| 9,312,712 | B2 | 4/2016 | Lee |
| 10,011,152 | B1 * | 7/2018 | Kremkau ............... B60F 3/0015 |
| 10,439,418 | B2 | 10/2019 | Yebka et al. |
| 10,547,189 | B2 | 1/2020 | Pourdarvish et al. |
| 10,587,135 | B2 | 3/2020 | Lundgren et al. |
| 2012/0091942 | A1 * | 4/2012 | Jones ......................... F03G 7/05 |
| | | | 320/101 |
| 2017/0225586 | A1 | 8/2017 | Zhang et al. |

FOREIGN PATENT DOCUMENTS

CN            105429227      *   3/2016   ............... H02J 7/00

* cited by examiner

*Primary Examiner* — Hal Kaplan
(74) *Attorney, Agent, or Firm* — Burns & Levinson, LLP; Christopher Carroll

(57) ABSTRACT

Systems and methods are described herein for regulating a charging rate of a battery module for an autonomous vehicle. In some aspects, the method comprises measuring a first battery cell temperature using a first temperature sensor located at a first battery cell of a plurality of batter cells in a battery module, determining whether the first battery cell temperature corresponds to a lowest temperature of the plurality of battery cells, determining a first charging rate corresponding to the first battery cell temperature, determining a first charging current and a first charging voltage corresponding to the first charging rate, and adjusting a charging current to the first charging current and a charging voltage to the first charging voltage for the battery module.

20 Claims, 7 Drawing Sheets

SYSTEM AND METHODS FOR REGULATING CHARGING RATE BASED ON ENVIRONMENTAL CONDITIONS

REFERENCE TO RELATED APPLICATIONS

This application claims priority to and the benefit of U.S. Provisional Patent Application No. 62/519,273, filed on Jun. 14, 2017, and entitled "System and Methods for Regulating Charging Rate Based on Environmental Conditions." The entire contents of the above-referenced application are incorporated herein by reference.

STATEMENT REGARDING FEDERALLY SPONSORED RESEARCH OR DEVELOPMENT

This invention was made with government support under N00014-14-C-0085 awarded by the Office of Naval Research (ONR). The government has certain rights in the invention.

BACKGROUND

The past several decades have seen a steady increase in the number of unmanned underwater robotic systems deployed for use in the ocean. These systems are also referred to as autonomous underwater vehicles (AUVs). All of these systems are equipped with energy systems including batteries to accomplish their respective mission. The conditions experienced by the batteries from its environment may affect the rate of charge. For example, for an autonomous vehicle that is underwater, the battery module may experience a lower temperature than room temperature. While batteries are typically capable of being discharged over a wide range of temperatures, batteries are more susceptible to damage caused by variations in temperature during the charging process. Early battery technology, such as lead acid and NiCd battery technology, typically have higher charging tolerances than newer battery technology. Hence, these types of batteries are able to be charged at temperatures below freezing. Fast charging of existing batteries is typically limited to 5 degrees Celsius to 45 degrees Celsius (41 degrees F. to 113 degrees F.). Some existing battery charging systems include a thermal blanket that heats a battery to an acceptable temperature. Consumer-grade lithium ion batteries cannot be charged below 0 degrees Celsius.

While it is possible to charge Li-ion batteries at low temperatures, acceptable current is very low and, therefore, the charge time is very long, which is not compatible with the desired pace of unmanned underwater vehicle operations. Excessive charging of a Lithium ion battery can cause damage to the battery, resulting reduction in battery capacity while making the battery unsafe. For example, in a Lithium ion battery, lithium ions move from the cathode to anode during charging and intercalate into the anode. In other words, the lithium ions are crammed in between the molecular gaps of the anode material's lattice, e.g., graphite. Graphite includes multiple graphene layers which reduce the anode's ability to convert the force from intercalation into internal stresses, resulting in significant volumetric strain on the anode (e.g., about 10-20% volume increase of the anode). This expansion can eventually weaken and puncture the membrane separating the anode from the cathode, causing a short of the battery cell and catastrophic failure. At cold temperatures, lithium ions do not efficiently intercalate into the graphite anode. Instead, the lithium ions plate the anode with metallic lithium (i.e., electroplate the anode), resulting in a substantial capacity reduction. Lithium plating of the anode also forms dendrites, which are tiny sharp tendrils of lithium metal that grow in the anode. These dendrites put pressure on the separating membrane (between the anode and cathode) as the anode expands and forces the dendrites into the membrane. Eventually, the membrane will fail, resulting in a short of the cathode and anode, which could further cause a catastrophic failure of the battery cell due to venting and possible ignition of flammable electrolyte.

Accordingly, there is a need for procedures and mechanisms such that a battery system, especially for an underwater vehicle subjected to low temperatures, can be protected against unacceptable damage during charging or discharging operations.

SUMMARY

Systems and methods are described herein for regulating a charging rate of a battery module for an autonomous vehicle. In some aspects, the method comprises measuring a first battery cell temperature using a first temperature sensor located at a first battery cell of a plurality of battery cells in a battery module, and determining whether the first battery cell temperature corresponds to a lowest temperature of the plurality of battery cells. In one aspect, the method further comprises, in response to determining that the first battery cell temperature corresponds to the lowest temperature of the plurality of battery cells, determining a first charging rate corresponding to the first battery cell temperature, determining a first charging current and a first charging voltage corresponding to the first charging rate, and adjusting a charging current to the first charging current and a charging voltage to the first charging voltage for the battery module.

In one implementation, the method further comprises, in response to determining that the first battery cell temperature does not correspond to the lowest temperature of the plurality of battery cells, measuring a second battery cell temperature using a second temperature sensor located at a second battery cell of the plurality of battery cells in the battery module, determining whether the second battery cell temperature corresponds to the lowest temperature of the plurality of battery cells, in response to determining that the second battery cell temperature corresponds to the lowest temperature of the plurality of battery cells, determining a second charging rate corresponding to the second battery cell temperature, determining a second charging current and a second charging voltage corresponding to the second charging rate, and adjusting the charging voltage to the determined second charging voltage and adjusting the charging current to the determined second charging current for the second battery module.

Another implementation includes a system arranged to control the temperature of an underwater vehicle at or in proximity to an underwater charging station. In this way, an underwater charging station (UCS) may adjust both the temperature of a target AUV battery system and its output voltage and/or current, i.e., charging rate, to the battery system of an AUV to optimize the charging rate and/or charge time for a AUV battery system. Alternatively, an AUV processor may interface with the UCS to control temperature and charging rate. The AUV processor may communication with the UCS via an electro-mechanical connection when the AUV is docked to the UCS or via a wireless connection (e.g., optical, acoustic, and/or electromagnetic signals). The UCS may include a housing into which an AUV or a portion of the AUV can be positioned when docked with the UCS. The housing may include one of more heater elements arranged to heat the water surrounding the battery housing of an AUV and, thereby, heat the battery system or one or more cells of the battery system. The AUV may include one or more heater elements that can be activated once the AUV is docked at or in proximity to the UCS. The UCS may include a processor that controls the AUV heater elements and/or UCS heater elements. The UCS may provide power to the AUV heater elements via an electro-mechanical connection with the AUV. Alternatively, the UCS may utilize inductive charging via an electromagnetic field to transfer energy between the UCS and an AUV via electromagnetic induction. In such an implementation, the UCS uses an induction coil to create an alternating electromagnetic field. An AUV also includes a second induction coil that takes power from the electromagnetic field generated by the UCS and converts it back into electrical current within the AUV to charge the battery cells of the AUV. Alternatively, the UCS may charge at a reduced rate until the battery warms during the charging process due to internal heating from internal resistance.

A UCS may be permanently or temporarily positioned on the ocean floor in a location in proximity to a geographic area where one or more AUVs are operating. In this way, an AUV can perform its missions and then interface with the UCS at its underwater location to be recharged without the need to surface. The UCS may include its own power source such as, for example, a battery, a fuel cell (e.g., hydrogen and/or oxygen fuel cell), a chemical reactor, a nuclear reactor, and the like.

The charging connection may include an electro-mechanical connector to facilitate transfer of electrical current to/from the charging station to the AUV and/or provide a communications connection between a processor of the underwater charging station and one or more processors within the AUV. As discussed above, inductive charging may be utilized. Also, wireless communications, as discussed above, may be used to exchange information, including control commands between the UCS and AUV. For example, a processor of the AUV may interface with one or more temperature sensors associated with one or more battery cells within the AUV. The AUV processor may receive temperature information from the one or more temperature sensors and, in response, send control information to the processor of the underwater charge station. The processor of the UCS may include and/or operate as a controller of the UCS to regulate the voltage and/or current output of the UCS, and/or temperature surrounding the battery housing of the AUV, in response to receiving control commands from the AUV processor. Alternatively, the UCS processor may receive temperature information directly from the AUV temperature sensors, or temperature information relayed by the AUV processor, process such temperature information to then determine an output voltage and/or current of the UCS, and/or temperature surrounding the battery housing of the AUV.

In a further aspect, the UCS may include a battery housing that stores replacement battery cells for an AUV. The UCS may charge the replacement battery cells while being stored with the UCS. When an AUV docks with the UCS, one or more AUV battery cells are removed from the AUV and replaced with the charged replacement battery cells. This process may be performed in an automated manner using, for example, a robotic and/or mechanical exchange system. The removed battery cells (which may be discharged) are stored within the UCS housing, charged by the UCS, and then arranged to be exchanged with the battery cells of another AUV (or the same AUV) when the AUV docks with the UCS for a battery charge. In this way, the system advantageously pre-charges battery cells to enable rapid exchange of battery cells and, ultimately, more rapid recharge of an AUV battery system, resulting in less downtime of an AUV. In one aspect, a ship or a surface charging station may include a battery housing that stores replacement batteries for the AUV.

In one implementation, one or more batteries of an AUV are arranged within a modular housing that is detachably connectable to the AUV. In this way, a UCS may efficiently remove the modular battery from an AUV and replace it with a replacement modular battery including fully charged battery cells. The UCS may provide auxiliary power to AUV components during the exchange of batteries. The AUV may include multiple modular batteries housings that the UCS may replace serially or in parallel.

Other objects, features, and advantages of the present invention will become apparent upon examining the following detailed description, taken in conjunction with the attached drawings.

BRIEF DESCRIPTION OF THE DRAWINGS

The systems and methods described herein are set forth in the appended claims. However, for purpose of explanation, several illustrative aspects are set forth in the following figures.

DETAILED DESCRIPTION

Figure 1:
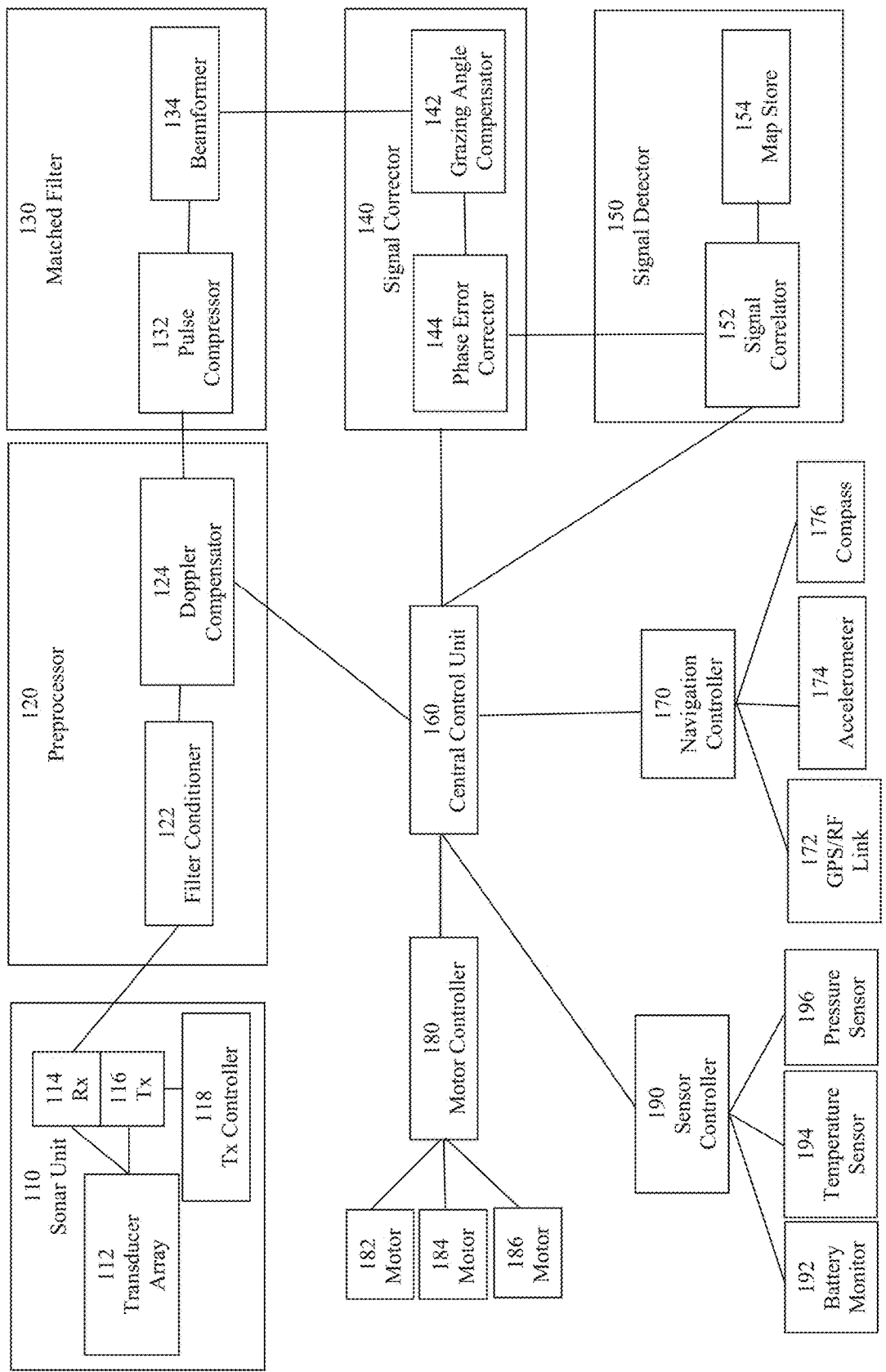
FIG. 1 is a block diagram of an exemplary remote vehicle system for implementing at least a portion of the systems and methods described in the present disclosure.

FIG. 1 is a block diagram depicting an illustrative remote vehicle, according to an illustrative aspect of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some aspects, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 192, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain aspects, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain aspects, the peak of the envelope may be identified with high-precision, including down to the order of about 1/100th of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain aspects the transducer array 112 includes separate projectors and receivers. The transducer array 112 may be configured to operate in SAS mode (either stripmap or spotlight mode) or in a real aperture mode. In certain aspects, the transducer array 112 is configured to operate as a multibeam echo sounder, sidescan sonar or sector scan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping. The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130. The matched filter 130 includes a pulse compressor 132 for performing matched filtering in range, and a beamformer 134 for performing matched filtering in azimuth and thereby performing direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety. The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one aspect, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain aspects the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
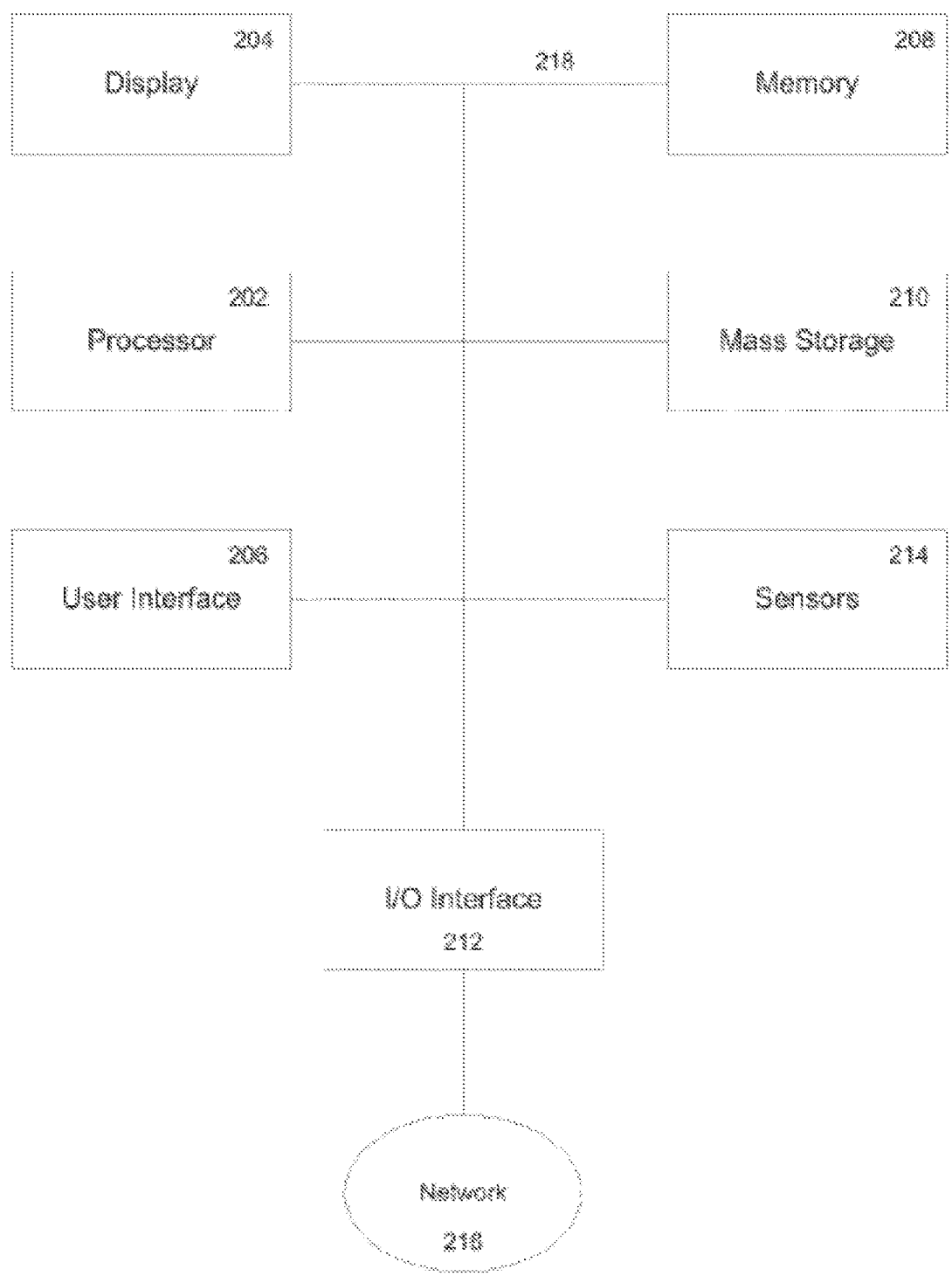
FIG. 2 is a block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative aspect of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some aspects, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some aspects, communications may occur over an acoustic modem. For instance, for AUVs, communications may occur over such a modem. Alternatively, the system 200 may include a mainframe or other type of host computer system capable of web-based communications via the network 216. In some aspects, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some aspects, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some aspects, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some aspects, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
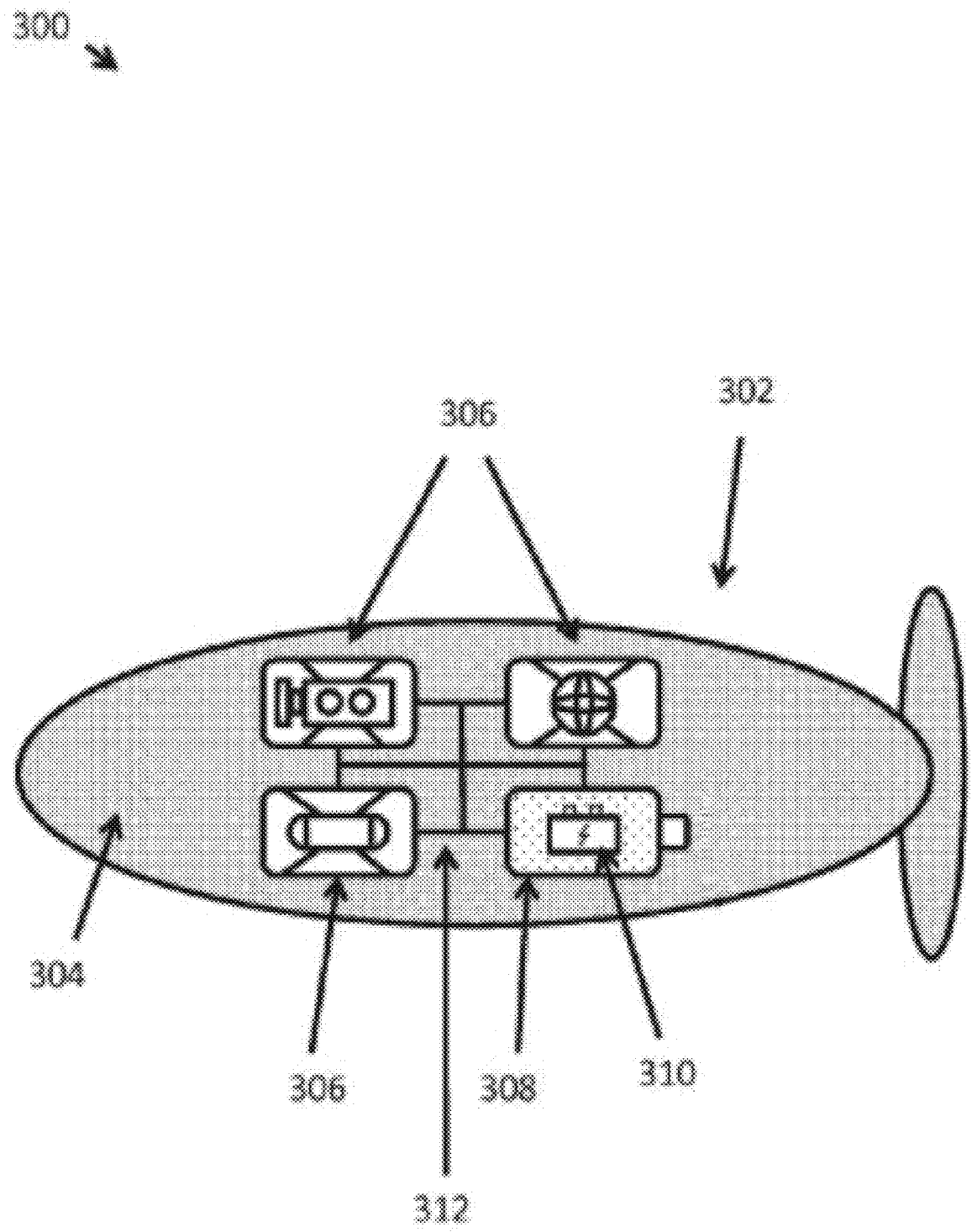
FIG. 3 is a block diagram depicting an exemplary remote vehicle, according to an illustrative aspect of the present disclosure.

FIG. 3 is a block diagram depicting an exemplary remote vehicle, according to an illustrative aspect of the present disclosure. Such an exemplary remote or autonomous vehicle includes a main body 302, along with a drive unit 304. For example, the drive unit 304 may be a propeller. The remote vehicle includes internal components, which may be located within different compartments within the main body 302. For example, the main body 302 may house a component 306. For example, the component 306 may be a sonar unit. Similarly, the main body 302 may house a pressure tolerant energy system 310, which may include a computer system, as described for example in FIG. 1 and FIG. 2. In addition, the remote or autonomous vehicle includes a power generating system 308. For example, the power generating system 308 may be a stack of battery elements, each comprising a stack of battery cells.

Large batteries use large arrays of cells. A series connection (with or without other parallel connections) may be required to meet specific power requirements. Any imbalance between cells may affect battery performance. If charging cells in series, charging is only desirable until one of the cells reaches its maximum cell voltage—proceeding with charging beyond that point would result in cell damage and/or may cause fire or explosion through the battery.

A vehicle, for example an underwater vehicle, may be powered by an array of battery packs, each battery pack comprising battery cells. These battery cells may comprise any suitable battery for providing energy to a vehicle, including, but not limited to, any suitable battery chemistry, a lithium battery, lithium-ion battery, lithium polymer battery, or a lithium sulfur battery. The battery cells may be in a matrix, or the battery cells may be arranged, aligned, or positioned in any suitable arrangement. In some aspects, the battery cells may be stacked on top of each other. In such aspects, the battery cells may include a separator between each vertically-stacked cell. The one or more battery cells may be positioned on a tray, wherein the tray provides structural support, alignment, and electrical insulation for the one or more battery cells. A backplane may connect the battery cells to management circuitry, described in further detail below. In alternate aspects, battery cells may be directly connected to the management circuitry. In some aspects, the battery cells may be connected to management circuitry through a communication network. A communication network may be any suitable network for communicating control signals. The management circuitry may comprise a pressure tolerant circuit board that may be manually programmed using any suitable programming language. In some aspects, a temperature sensor may be connected to the battery cells, either directly or through backplane. The battery cells may be configured to communicate cell health information, including at least a voltage and temperature, to the management circuitry. The management circuitry may include a water-intrusion detection circuit board, which may comprise a conductive trace that drops in resistance in the presence of water.

The primary factors that affect mission duration and sensor payload capability of an autonomous vehicle include the performance of the battery modules, including their ability to charge and discharge. Equally important for certain cell chemistries (e.g., Lithium Ion) is circuitry used in the management of the battery components. A battery manager (BMGR) may be configured to interface with the outside world and to protect the battery (by disconnecting the charge input and/or discharge output) if voltage or temperature safety limits are exceeded. The BMGR may shut down the battery immediately if it detects any individual cell voltage above the max cell voltage, or if any individual cell temperature exceeds a manufacturer recommended maximum temperature. The BMGR may disable charging of the battery system if any cell temperature is below a manufacturer recommended minimum temperature. The BMGR may disable discharging of the battery system if any cell temperature is below a manufacturer recommended minimum temperature for discharge, which may differ from the charge limit temperature. An over-discharge protection feature may be activated at any time, which will also shut down the battery if any individual cell voltage drops below a manufacturer recommended minimum cell voltage. To prevent an over-current condition, the battery system may be equipped with a pressure tolerant fuse in series with the positive terminal, and the BMGR may provide a controllable dual disconnect (high and low side switches). Further details regarding an exemplary pressure tolerant fuse are provided in U.S. Patent Application Publication No. 2012/0281503, the entire contents of which are incorporated herein by reference. This provides a safety feature by requiring two concurrent failures to happen before an uncommanded output voltage can be presented at the battery output.

Figure 4:
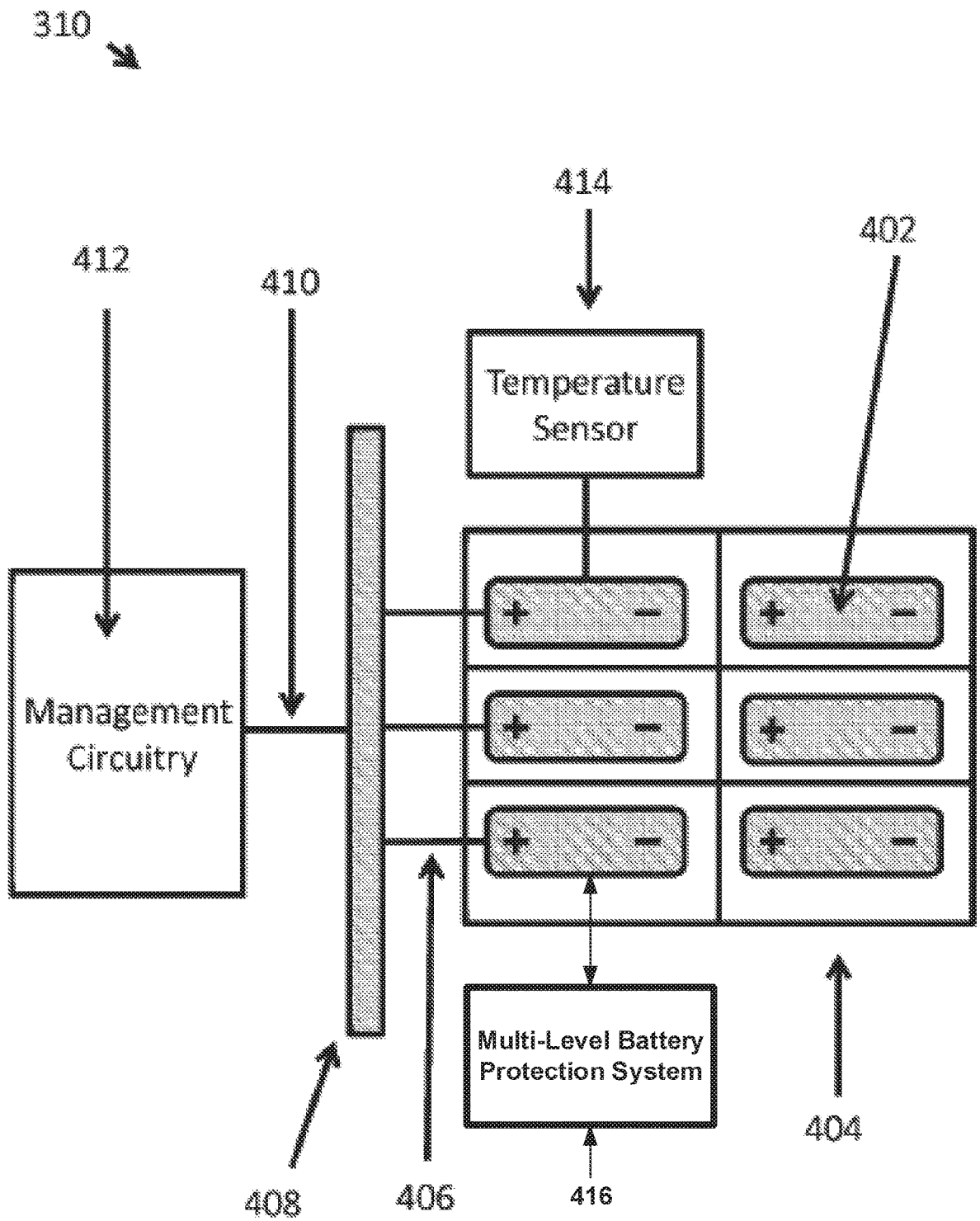
FIG. 4 is a block diagram depicting an illustrative example of a pressure tolerant energy system, according to an illustrative aspect of the present disclosure.

FIG. 4 is a block diagram depicting an illustrative example of a pressure tolerant energy system, such as the pressure tolerant energy system 310 depicted in FIG. 3. The pressure tolerant energy system 310 may comprise one or more battery cells 402, tray 404, electrical connections 406, backplane 408, communication network 410, management circuitry 412, a temperature sensor 414, and a multi-level battery protection system 416.

The battery cells 402 may comprise any suitable battery for providing energy to an underwater vehicle, including, but not limited to, a lithium battery, lithium-ion battery, lithium polymer battery, or a lithium sulfur battery. In some aspects, the battery cells 402 may be neutrally buoyant (e.g., compared to fresh water or sea/ocean water). Although the battery cells 402 are depicted in FIG. 4 in a 3×2 matrix, the battery cells 402 may be arranged, aligned, or positioned in any suitable arrangement. In some aspects, the battery cells 402 may be stacked on top of each other. In such aspects, the battery cells 402 may include a separator between each vertically-stacked cell.

The battery cells 402 may be placed into tray 404. The tray 404 may be made from any suitable material, such as thermoformed plastic. The tray 404 may provide structural support, alignment, and electrical insulation for the battery cells 402.

The battery cells 402 may be electrically and/or structurally connected to backplane 408. The backplane may provide both structural support and alignment for the battery cells 402. The backplane may also connect to an energy distribution system, such as energy distribution system 312 depicted in FIG. 3. In alternate aspects, the battery cells 402 may be connected directly to an energy distribution system.

The backplane may connect the battery cells 402 to the management circuitry 412. In alternate aspects, battery cells 402 may be directly connected to the management circuitry 412. In some aspects, the battery cells 402 may be connected to management circuitry 412 through communication network 410. Communication network 410 may be any suitable network for communicating control signals. The management circuitry 412 may comprise a pressure tolerant circuit board that may be manually programmed using any suitable programming language. In some aspects, a temperature sensor may be connected to the battery cells 402, either directly or through backplane 408. The battery cells 402 may be configured to communicate cell health information, including at least a voltage and temperature, to the management circuitry 412. The management circuitry 412 may include a water-intrusion detection circuit board, which may comprise a conductive trace that drops in resistance in the presence of water. The battery cells 402 may be connected to the multi-level battery protection system 416.

Figure 5:
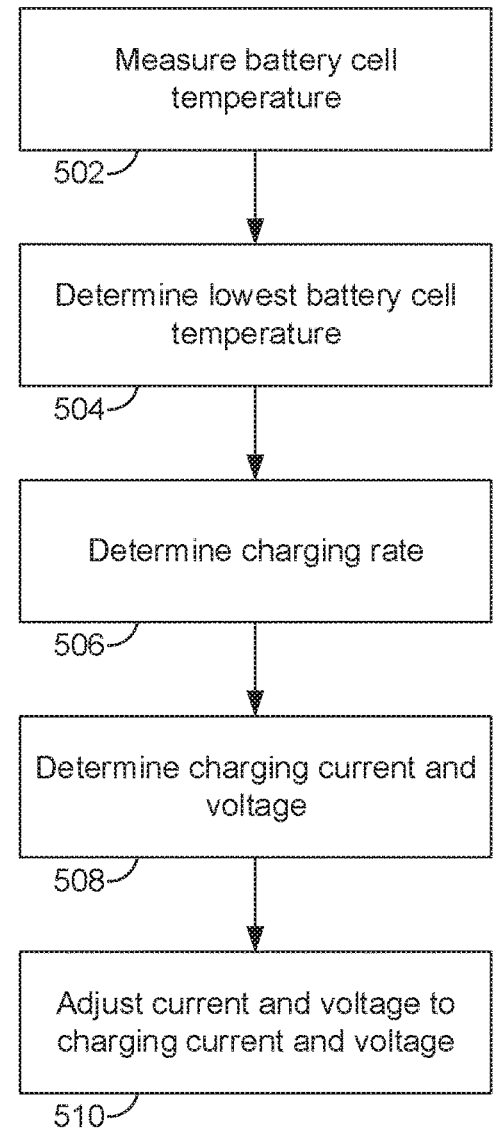
FIG. 5 is a flow diagram of method steps for regulating the charging rate of a battery module, according to an illustrative aspect of the present disclosure.

FIG. 5 is a flow diagram of a process 500 for regulating the charging rate of a battery cell 402 in a pressure tolerant energy system 310. Process 500 begins by measuring the battery cell temperature at step 502. The battery cell temperature may be measured by temperature sensor 414. Each battery cell 402 in pressure tolerant energy system 310 may have its own temperature sensor 414. Each temperature sensor 414 may send a signal including an indication of the battery cell temperature for the corresponding battery cell 402 to the management circuitry 412.

Process 500 continues by determining the lowest battery cell temperature at step 504. The process for determining the lowest battery cell temperature is discussed further in the discussion of process 600. Management circuitry 412 may determine the lowest battery cell temperature after receiving the battery cell temperature for each battery cell 402 from each temperature sensor 414.

Process 500 continues by determining the charging rate at step 506. The charging rate may correspond to the lowest battery cell temperature. In another aspect, the charging rate may correspond to the average battery cell temperature. The average battery cell temperature may be calculated by management circuitry 412 based on the battery cell temperatures for each battery cell 402 from each temperature sensor 414. The charging rate may be determined by management circuitry 412 based on the manufacturer's recommendation of the charging rate for the battery cells 402 experiencing a particular temperature.

Process 500 continues by determining the charging current and charging voltage at step 508. The charging current and charging voltage may be based on the charging rate determined at step 506. Management circuitry 412 may determine the charging current and charging voltage based on the charging rate. The charging current and charging voltage may be limited to be within a certain amount in order to prevent the battery cells 402 from being damaged.

Process 500 finishes by adjusting the current and voltage to the determined charging current and charging voltage at step 510. The current and voltage may be adjusted by the management circuitry 412 for each battery cell 402. The current and voltage may be adjusted during the charging process and/or set at the onset of the charging process.

Figure 6:
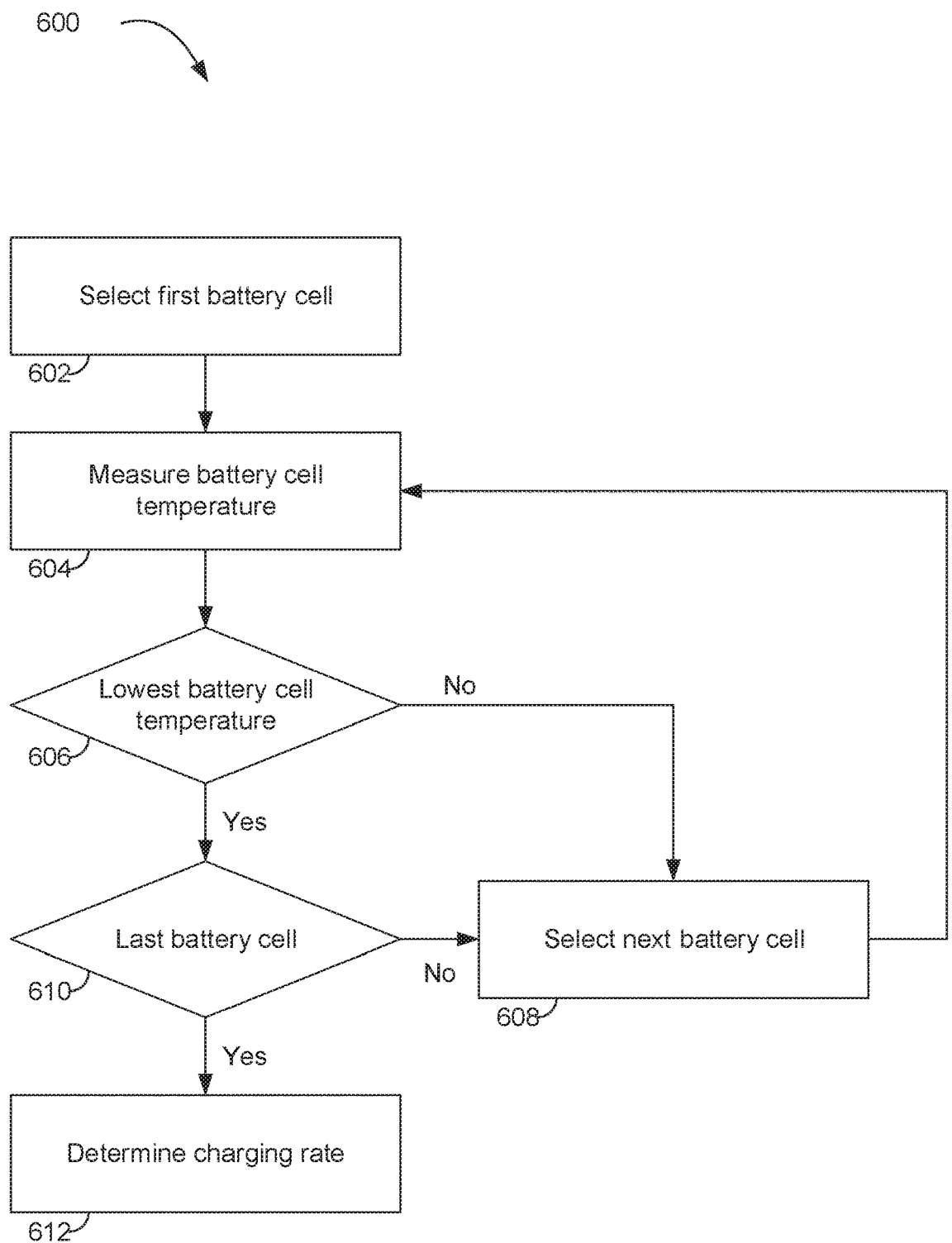
FIG. 6 is a flow diagram of method steps for determining a battery cell with the lowest temperature in a battery module, according to an illustrative aspect of the present disclosure.

FIG. 6 is a flow diagram of a process 600 for determining a battery cell 402 with the lowest temperature in a pressure tolerant energy system 310. Process 600 begins by selecting the first battery cell 402 in the pressure tolerant energy system 310 at step 602. One of the battery cells 402 in the pressure tolerant energy system may be selected as the first battery cell 402 by the management circuitry 412.

Process 600 continues by measuring the battery cell temperature of the selected battery cell 402 at step 604. The battery cell temperature may be measured by temperature sensor 414. Each battery cell 402 in pressure tolerant energy system 310 may have its own temperature sensor 414. The temperature sensor 414 of the selected battery cell 402 may send a signal including an indication of the battery cell temperature for the selected battery cell 402 to the management circuitry 412.

Process 600 continues by determining whether the battery cell temperature of the selected battery cell 402 is the lowest battery cell temperature at step 606. The management circuitry 412 may make the determination by comparing the battery cell temperature of the selected battery cell 402 with the battery cell temperature of the previously selected battery cell 402. The management circuitry 412 may also make the determination by keeping track of the lowest battery cell temperature measured by each temperature sensor 414. If the battery cell temperature of the selected battery cell 402 is not the lowest battery cell temperature, process 600 proceeds to step 608. If the battery cell temperature of the selected battery cell 402 is the lowest battery cell temperature, process 600 proceeds to step 610.

Process 600 continues by selecting the next battery cell 402 at step 608. The next battery cell 402 may be a battery cell 402 that has not been selected previously. If all of the battery cells 402 have already been selected, management circuitry 412 may select the battery cell 402 with the previously determined lowest battery cell temperature. Process 600 continues by proceeding to step 604.

Process 600 continues by determining whether the selected battery cell 402 is the last battery cell at step 610. If the selected battery cell 402 is not the last battery cell 402, process 600 continues to step 608. If the selected battery cell 402 is the last battery cell 402, process 600 continues to step 612.

Process 600 finished by determining the charging rate at step 612. The charging rate may be determined based on the determined lowest battery cell temperature. Step 612 is further described by steps 506-510 of process 500.

Figure 7:
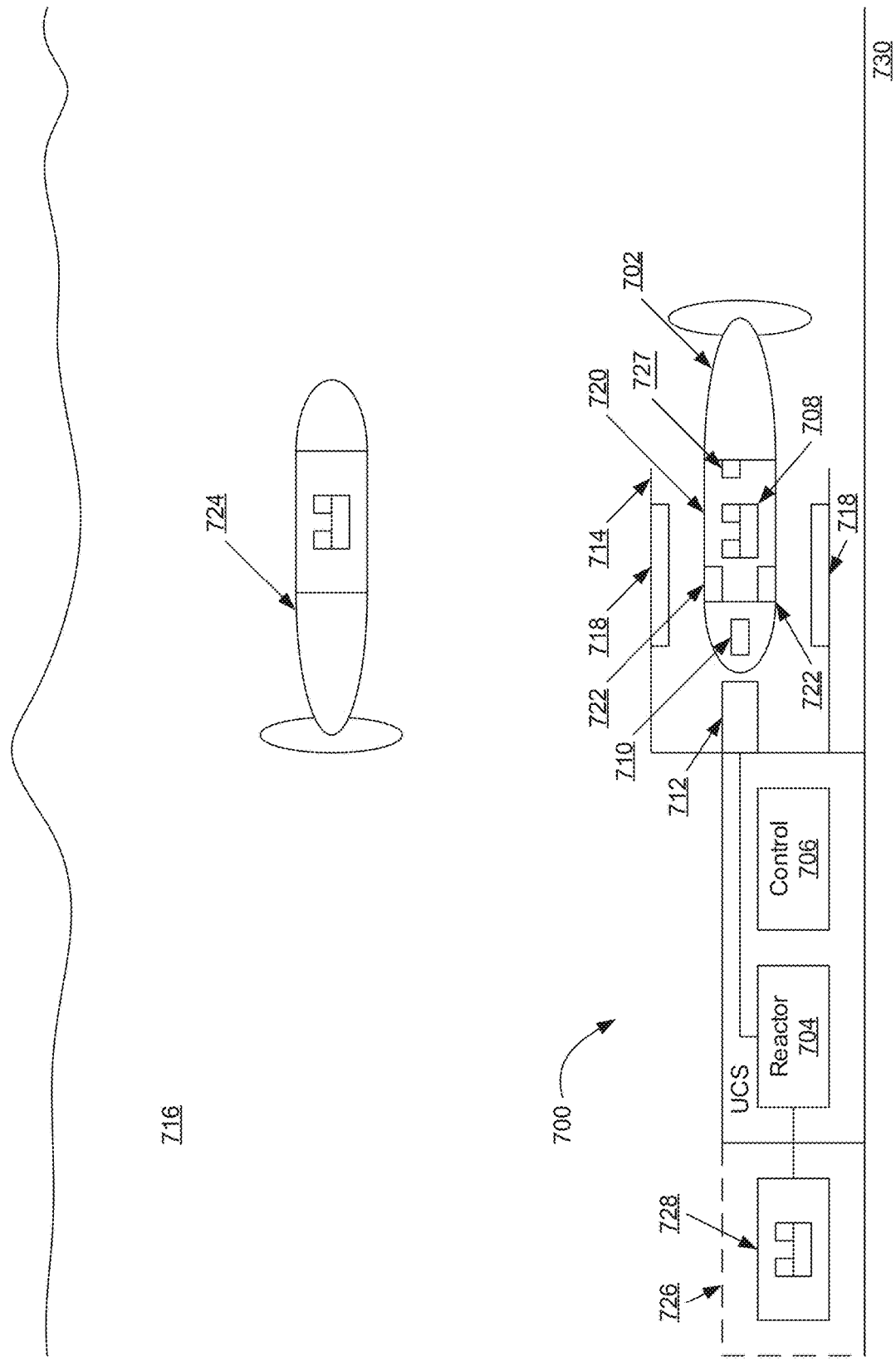
FIG. 7 shows an exemplary underwater charging (UCS) system and docked autonomous underwater vehicle, according to an illustrative aspect of the disclosure.

FIG. 7 shows an exemplary underwater charging (UCS) station 700 and docked autonomous underwater vehicle 702 within a body of water 716 according to an illustrative aspect of the disclosure. The UCS 700 includes a power source 704 and a controller 706. The power source may include a battery, a fuel cell (e.g., hydrogen and/or oxygen fuel cell), a diesel generator, a chemical reactor, a nuclear reactor, ship power, shore power, a power cable, and the like.

One implementation includes a system, i.e., an UCS 700, arranged to control the temperature of an underwater vehicle 702 at or in proximity to the underwater charging station 700. In this way, an UCS 700, via controller 706, may adjust both the temperature of a target AUV 702 battery system and its output voltage and/or current, i.e., charging rate, to the battery cells 708 of an AUV 702 to optimize the charging rate and/or charge time for AUV battery cells 708. Alternatively, a processor 710 of AUV 702 may interface with the UCS 700 to control temperature and charging rate. The processor 710 may communicate with the UCS 700 via an electro-mechanical connection 712 when the AUV 702 is docked to the UCS 700 or via a wireless connection (e.g., optical, acoustic, and/or electromagnetic signals). Processor 706 and/or processor 710 may adjust the UCS 700 output voltage and/or current based on other environmental conditions such as pressure, water salinity, water chemistry, battery history, The UCS 700 may include a housing 714 into which an AUV 702 or a portion of the AUV 702 can be positioned when docked with the UCS 700. The housing 714 may include one or more heater elements 718 arranged to heat the water surrounding a battery housing 720 of an AUV 702 and, thereby, heat the battery system 708 or one of more cells of the battery system 708. The AUV 702 may include one or more heater elements 722 that can be activated once the AUV 702 is docked at or in proximity to the UCS 700. The UCS 700 may include a controller and/or processor 706 that controls the AUV heater elements 722 and/or UCS heater elements 718. The UCS 700 may provide power to the AUV heater elements 722 via the electro-mechanical connection 712 with the AUV 702. Alternatively, the UCS 700 may utilize inductive charging via an electromagnetic field to transfer energy between the UCS 700 and an AUV 702 via electromagnetic induction. In such an implementation, the UCS 700 uses at least one induction coil to create an alternating electromagnetic field. The AUV 702 also includes at least a second induction coil that takes power from the electromagnetic field generated by the UCS 700 and converts it back into electrical current within the AUV 702 to charge the battery cells of the AUV 702. The UCS 700 may vary the charge rate in response to temperature, slowly charging batteries and increasing the rate as they warm due to internal resistance.

The UCS 700 may be permanently or temporarily positioned on the floor 730 of a body of water 716 in a location in proximity to a geographic area where one or more AUVs 702 and 724 are operating. In this way, an AUV 702 can perform its missions and then interface with the UCS 700 at its underwater location to be recharged without the need to surface. The UCS 700 may include its own power source such as, for example, a battery, a fuel cell (e.g., hydrogen and/or oxygen fuel cell), a chemical reactor, a nuclear reactor, and the like.

The charging connection 712 may include an electromechanical connector to facilitate transfer of electrical current to/from the charging station 700 to the AUV 702 and/or provide a communications connection between the processor 706 of the underwater charging station 700 and one or more processors 710 within the AUV 702. As discussed above, inductive charging may be utilized. Also, wireless communications, as discussed above, may be used to exchange information, including control commands between the UCS 700 and AUV 702. For example, processor 710 of the AUV 702 may interface with one or more temperature sensors 727 and, in response, send control information to the processor 706 of the underwater charge station 700. The processor 706 of the UCS 700 may include and/or operate as a controller of the UCS 700 to regulate the voltage and/or current output of the UCS 700, and/or temperature surrounding the battery housing 720 of AUV 702, in response to receiving control commands from the AUV processor 710. Alternatively, the UCS processor 706 may receive temperature information directly from the AUV temperature sensors 727, or temperature information relayed by the AUX processor 710, process such temperature information to then determine an output voltage and/or current of the UCS 700, and/or temperature surrounding the battery housing 720 of the AUV 702.

In a further aspect, the UCS 700 may include a battery housing 726 that stores replacement battery cells 728 for AUV 702. The UCS 700 may charge the replacement battery cells 728 while being stored with the UCS 700. When AUV 702 docks with the UCS 700, one or more AUV battery cells 708 are removed from AUV 702 and replaced with the charged replacement battery cells 728. This process may be performed in an automated manner using, for example, a robotic and/or mechanical exchange system. The removed battery cells 708 (which may be discharged) are then stored within the UCS battery housing 726, charged by the UCS 700, and then arranged to be exchanged with the battery cells 708 of another AUV (or the same AUV 702) when the AUV 702 docks with the UCS 700 for a battery charge. In this way, the system advantageously pre-charges battery cells 728 to enable rapid exchange of battery cells and, ultimately, more rapid recharge of an AUV battery system, resulting in less downtime of an AUV.

In one implementation, one or more batteries 708 of an AUV 702 are arranged within a modular housing 720 that is detachably connectable to the AUV 702. In this way, a UCS 700 may efficiently remove the modular battery housing 720 from an AUV 702 and replace it with a replacement modular battery housing including fully charged battery cells 728. The UCS 700 may provide auxiliary power to AUV 702 components during the exchange of battery cells 708 and 728. The AUV 702 may include multiple modular battery cell housings that the UCS 700 may replace serially or in parallel. In one implementation, one or more batteries may be interchangeable and be arranged to be exchanged between the UCS 700 and AUV 702.

In one configuration, the UCS 700 includes a ballast system controlled by the controller 706 to enable the UCS to descend to and/or ascend to the floor 730. The controller 706 may monitored the available power from the power source 704. Once the available power reaches a low output threshold, the controller 706 may control the ballast system to cause the UCS 700 to ascend to the surface of the body 716 for refueling and/or maintenance. The controller 706 may initiate an ascent for other reasons such as a system failure or periodic maintenance. The UCS 700 may be tethered to a surface vessel and/or the floor 730. The controller 706 may control the depth of the UCS 700 such that the UCS 700 maintains an intermediate depth between the surface and floor 730. The UCS 700 controller 706 may control and/or maintain a lateral and/or vertical position of UCS 700 by controlling attitude and motion control elements (e.g., directional propellers). Thus, the UCS 700 may be configured to operate in a body of water where the floor 730 is too deep for the UCS 700 or AUVs 702 and 724, the UCS operating at depths safe for UCS and AUV operations.

It will be apparent to those skilled in the art that such aspects are provided by way of example only. It should be understood that numerous variations, alternatives, changes, and substitutions may be employed by those skilled in the art in practicing the invention. Accordingly, it will be understood that the invention is not to be limited to the aspects disclosed herein, but is to be understood from the following claims, which are to be interpreted as broadly as allowed under the law.

The invention claimed is:

1. A method for regulating a charging rate of a battery module for an autonomous underwater vehicle, the method comprising:

measuring a first battery cell temperature using a first temperature sensor located at a first battery cell of a plurality of battery cells in a battery module;

determining whether the first battery cell temperature corresponds to a lowest temperature of the plurality of battery cells;

in response to determining that the first battery cell temperature corresponds to the lowest temperature of the plurality of battery cells, determining a first charging rate corresponding to the first battery cell temperature;

determining a first charging current and a first charging voltage corresponding to the first charging rate; and adjusting a charging voltage to the determined first charging voltage and adjusting a charging current to the determined first charging current for the battery module.

2. The method of claim 1, further comprising:

in response to determining that the first battery cell temperature does not correspond to the lowest temperature of the plurality of battery cells, measuring a second battery cell temperature using a second temperature sensor located at a second battery cell of the plurality of battery cells in the battery module;

determining whether the second battery cell temperature corresponds to the lowest temperature of the plurality of battery cells;

in response to determining that the second battery cell temperature corresponds to the lowest temperature of the plurality of battery cells, determining a second charging rate corresponding to the second battery cell temperature;

determining a second charging current and a second charging voltage corresponding to the second charging rate; and adjusting the charging voltage to the determined second charging voltage and adjusting the charging current to the determined second charging current for the second battery module.

3. The method of claim 1, comprising, in response to measuring the first battery cell temperature, adjusting the temperature surrounding one or more battery cells.

4. The method of claim 3, comprising adjusting the current to at least one heating element located in proximity to the one or more battery cells to adjust the temperature.

5. The method of claim 4, wherein the at least one heating element is located within a housing of the autonomous underwater vehicle.

6. The method of claim 4, wherein the at least one heating element is located outside of the housing of the autonomous underwater vehicle.

7. The method of claim 6, wherein the at least one heating element is located within a housing of an underwater charging station, the autonomous underwater vehicle being docked with the underwater charging station.

8. The method of claim 1 comprising providing a processor for controlling the measuring, determining, and adjusting.

9. The method of claim 8, wherein the processor is located within at least one of the autonomous underwater vehicle, an underwater charging station, a surface charging station, and a ship.

10. The method of claim 9 comprising providing an electro-mechanical connection between the autonomous underwater vehicle and the underwater charging station.

11. An underwater charging system for regulating a charging rate of a battery module for an undersea battery of an autonomous underwater vehicle, the underwater charging system comprising:

a power source and a controller; and a docking interface to the autonomous underwater vehicle battery module, wherein the controller is configured to adjust a temperature of the battery module and an output power of the power source.

12. The underwater charging system of claim 11, wherein the power source comprises any one of a battery, fuel cell, generator, ship power, shore power, undersea cable, offshore windfarm, chemical reactor, and nuclear reactor.

13. The underwater charging system of claim 11, wherein the autonomous underwater vehicle further comprises a processor.

14. The underwater charging system of claim 13, wherein the controller is configured to interface with the processor of the autonomous underwater vehicle via the docking interface to adjust the temperature of the battery module and the output power of the power source.

15. The underwater charging system of claim 14, wherein the processor interfaces with the controller via the docking interface using one of an electro-mechanical connection and wireless connection.

16. The underwater charging system of claim 11, wherein the controller adjusts the output power of the power source based on at least one of the temperature, a water pressure, a water salinity, a water chemistry, and a battery history.

17. The underwater charging system of claim 11, wherein the underwater charging system further comprises a housing configured to receive at least a portion of the docked autonomous underwater vehicle.

18. The underwater charging system of claim 17, wherein the housing further comprises at least one heater element configured to heat a volume of water surrounding the autonomous underwater vehicle.

19. The underwater charging system of claim 18, wherein the controller adjusts the temperature of the battery module using the heater element.

20. The underwater charging system of claim 11, wherein the underwater charging system is configured to be positioned on a floor of a body of water.

\* \* \* \* \*